Oct. 11, 1955  E. G. HJÄRPE  2,720,433
BALL BEARING FOR OSCILLATING MOVEMENT
Filed July 21, 1953  2 Sheets-Sheet 1
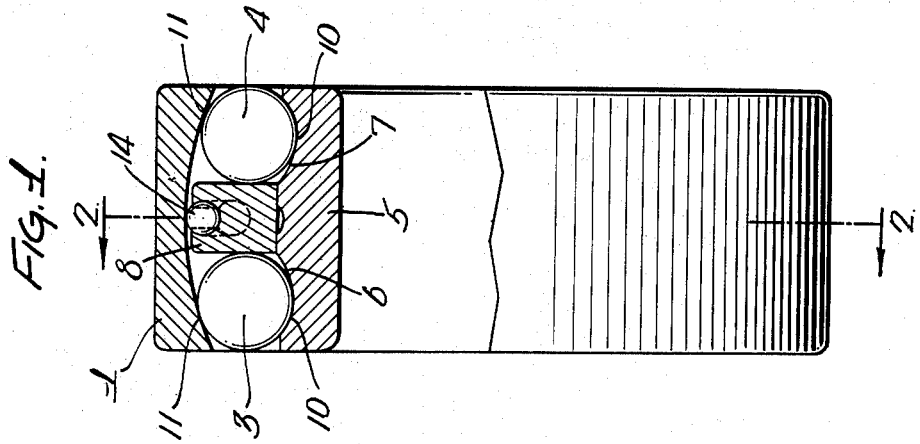
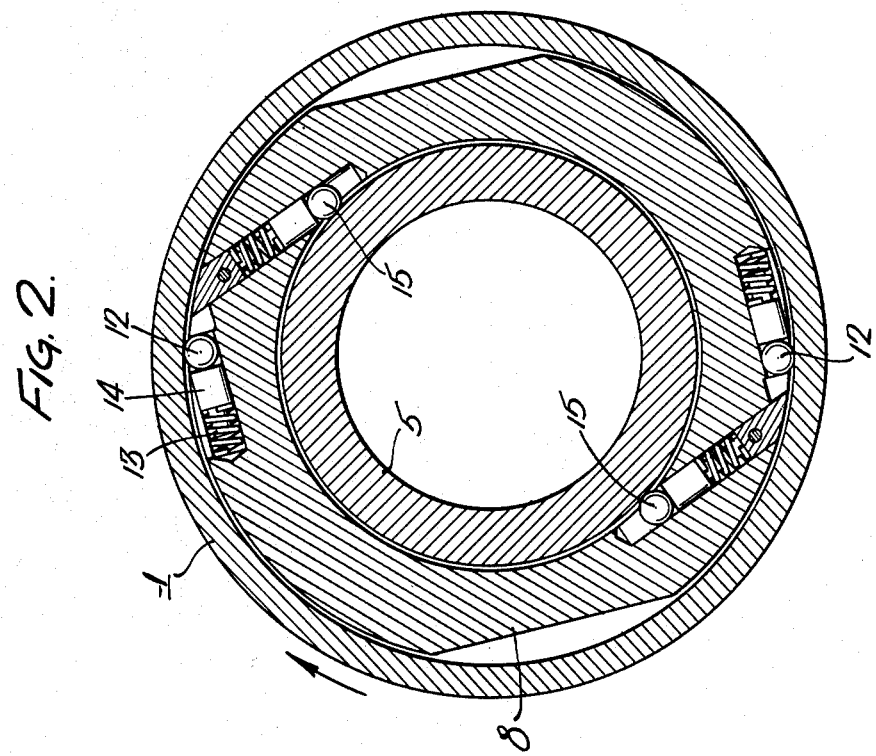
Inventor:
Eric Georg Hjärpe
by his Attorneys
Howson & Howson Oct. 11, 1955     E. G. HJÄRPE     2,720,433
BALL BEARING FOR OSCILLATING MOVEMENT
Filed July 21, 1953     2 Sheets-Sheet 2
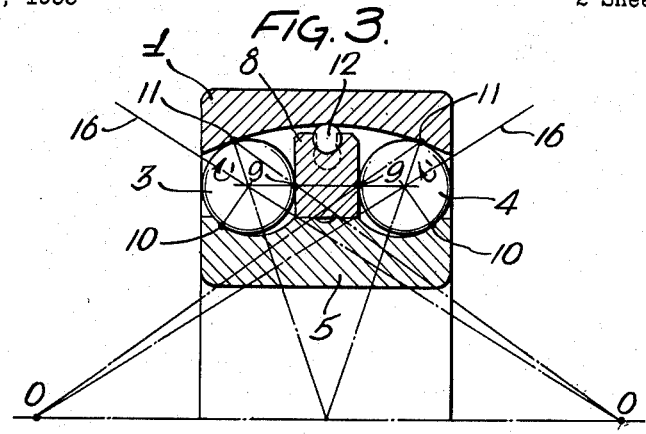
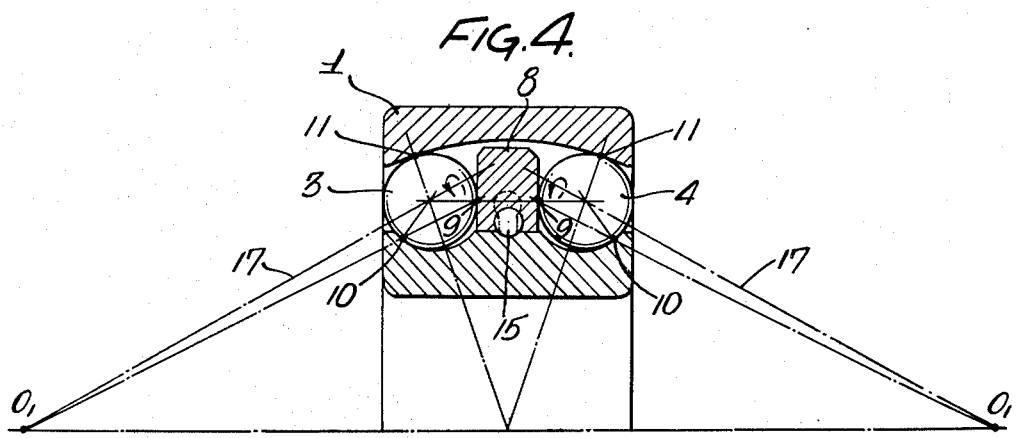
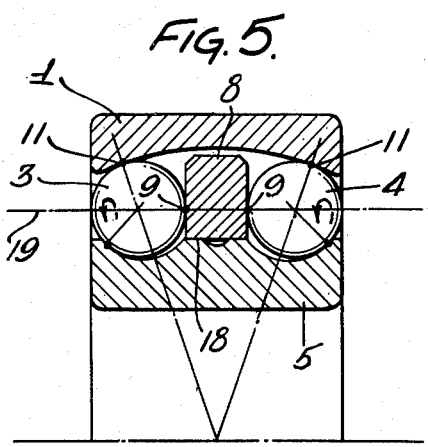
Inventor:
Eric Georg Hjärpe
by his Attorneys
Howson & Howson United States Patent Office 2,720,433
Patented Oct. 11, 1955

2,720,433
BALL BEARING FOR OSCILLATING MOVEMENT

Eric Georg Hjärpe, Goteborg, Sweden, assignor to Aktiebolaget Svenska Kullagerfabriken, Goteborg, Sweden, a corporation of Sweden Application July 21, 1953, Serial No. 369,335

Claims priority, application Sweden February 8, 1951

3 Claims. (Cl. 308—194)

In rolling bearings, which are subject to vibrations or to very small oscillating movements wear occurs in the races of the bearing rings, which gradually results in the formation of indentations or depressions in the races, thus destroying the bearings. The present invention relates to an improvement in rolling bearings for mounting where there is considerable vibration, or where the bearing is subjected to a short oscillating movement and has for its purpose to provide a bearing in which the formation of indentations will be avoided.

The invention relates to ball bearings having two sets of balls located laterally of each other, especially for oscillating movement, the said bearing having an outer race ring and an inner race ring concentric therewith, there being a substantially annular member disposed between the two sets of balls and in contact with the said balls, one or more releasable clutch members adapted and disposed to connect the annular member and at least one of the race rings during movement of the bearing in one direction and disconnect them during movement in the opposite direction.

The present application is a continuation-in-part of my former application, Serial No. 268,159, filed January 25, 1952, which application has now become, and stands, abandoned.

The invention is illustrated on the accompanying drawings in which Fig. 1 shows a portion of an axial section through a self-aligning bearing. Fig. 2 shows a section along lines II—II in Fig. 1. Fig. 3 shows the positions of the axes of rotation of the balls during rotation of the bearing in the direction during which the annular member moves in the same direction as the outer race ring. Fig. 4 shows the position of the axes of the rotation of the balls during rotation of the bearing in the opposite direction, during which the annular member moves in the same direction as the inner race ring. Fig. 5 shows the positions of the axes of rotation of the balls when the annular member is not positively connected to either of the race rings.

The bearing shown in Fig. 1 is of self-aligning type and is thus provided with an outer race ring 1 having a spherical raceway 2 which is common to both rows of balls, 3 and 4 respectively. The inner ring 5 on the other hand is provided with a separate race 6 and 7 respectively for each row of balls. Between the rows of balls is located a clutch ring 8, the construction of which is clearly shown in Fig. 2.

At least within the loaded zone of the bearing the balls 3 and 4 respectively will simultaneously contact with the annular member 8 at the points of contact 9 and with the races 6 and 7 respectively, at the points 10 and also with the spherical race 2 at the points 11.

The annular member 8 is provided with clutch members for connecting it with either or both of the race rings, as described in the following. The clutch members comprise balls (or rollers) 12 and 15 respectively, which are pressed against the respective bearing rings by means of springs 13 and small pistons 14 disposed in pockets in the clutch ring. As is apparent from the figure, the balls 12 act upon the outer ring 1, while the balls 15 act upon the inner ring 5. The clutch members are adapted and disposed that when the outer ring 1 is turned clockwise, as shown by the arrow in Fig. 2, the balls 12 act to cause the ring 8 to take part in the turning movement, while the balls 15 are inoperative. The balls will in this case rotate about axes as shown at 16 in Fig. 3, i. e. each ball will rotate approximately about an axis passing through the center of the ball and the point of intersection O of the bearing axis and a line through the points of contact 9 and 11 of the ball with the annular member 8 and the race ring 1 respectively, these members being temporarily interconnected by the clutch member 12.

If the outer ring is turned in the opposite direction on the other hand, the balls 12 will be inoperative, while the balls 15 will connect the clutch ring 8 to the inner ring 5. The balls will in this case rotate about axes as shown at 17 in Fig. 4, i. e. each ball will rotate approximately about an axis passing through the center of the ball and the point of intersection $O_1$ of the bearing axis and a line through the points of contact 9 and 10 of the ball with the annular member 8 and the race ring 5 respectively, these members being temporarily interconnected by the clutch member 15.

An oscillating movement of the outer ring thus results in a stepwise progressive movement of the clutch ring 8 in a clockwise direction, as shown in Fig. 2.

If the clutch members are provided only between the annular member and the outer race ring 1, (the clutch members 15 having been dispensed with) the clutch member 12 will carry with it the annular member 8 during rotation of the outer race ring in the clockwise direction, as described above, but during rotation of the outer race ring in an anti-clockwise direction the member 8 can remain stationary relative to the inner race ring 5, if the friction at the surfaces between these two members is sufficiently great. The bearing then functions in the same manner as though there were clutch members acting between the annular member 8 and both of the race rings. If, on the other hand, the friction at the surface 18 in Fig. 5 is insufficient to keep the annular member 8 stationary relative to the inner race ring 5 during the counterclockwise rotation of the outer race ring the balls 3 and 4 will rotate approximately about axes, as indicated at 19 in Fig. 5, passing through the points of contact 9. The friction at these points of contact causes the member 8 to be carried along by the balls 3 and 4 at a speed equal to the planetary speed of the balls. An oscillatory movement of the outer race ring 1 thus results in an oscillatory movement of the annular member 8 in which, however, the movement in the direction in which the clutch member 12 is active will be greater than the movement in the opposite direction and the annular member will thus move in a stepwise progressive manner in the clockwise direction of Fig. 2.

Alternatively the clutch member 15 acting on the inner race ring may be retained and the clutch members 12 be removed.

The rolling conditions for the balls are thus entirely different when the outer ring is turned in one direction from when it is turned in the opposite direction. For this reason the balls never return to their original positions when the outer ring is turned backwards, but are caused to take part in a progressive stepwise movement about the bearing in the same direction as the ring 8. In this manner the repeated to and fro rolling movement on limited surfaces, which causes the formation of indentations, is avoided.

The invention can also be applied to other types of bearings, for instance deep groove ball bearings and angular contact bearings. The clutch members mentioned in the above specification need not be adapted to positively interconnect the members. For the purpose of the invention, it is sufficient that they provide a frictional force of such magnitude that the annular member is carried along with the race ring.

I claim:

1. Ball bearing for oscillating movement having two sets of balls located laterally of each other, the said bearing having an outer race ring and an inner race ring concentric therewith, there being a substantially annular member disposed between the two sets of balls and in contact with the said balls, a releasable clutch member adapted and disposed to connect the annular member and at least one of the race rings during movement of the bearing in one direction and disconnect them during movement in the opposite direction.

2. A ball bearing according to claim 1, characterized thereby, that the clutch member acting between the annular member and the outer race ring and the clutch member acting between the annular member and the inner race ring are adapted to function during movement in opposite directions.

3. In a double row self-aligning ball bearing, an inner bearing ring having raceways for the balls of the respective rows, an outer bearing ring having a spherical raceway common to the balls of both rows, a substantially annular member disposed between the said rows and in contact with the balls, said member being of such width that the balls are subjected to pre-loading, at least one overrunning clutch member adapted and disposed to connect the annular member with one of the said bearing rings during bearing movement in one direction but disconnect them upon movement in the other direction and at least one other overrunning clutch member adapted and disposed to connect the annular member to the other of said bearing rings during bearing movement in the direction in which the first mentioned clutch member is inoperative and disconnect the annular member from the bearing ring during movement in the opposite direction.

References Cited in the file of this patent

UNITED STATES PATENTS

| | | |
|---|---|---|
| 2,453,291 | Wilford | Nov. 9, 1948 |
| 2,502,986 | Phillips | Apr. 4, 1950 |